United States Patent [19]

Calabro

[11] 4,424,670

[45] Jan. 10, 1984

[54] DEVICE FOR PILOTING THE PROPULSION SYSTEM OF A SOLID PROPELLANT ROCKET

[76] Inventor: Max J. Calabro, Suresnes, Hauts-de-Seine, France

[21] Appl. No.: 124,349

[22] Filed: Feb. 25, 1980

[30] Foreign Application Priority Data

Feb. 27, 1979 [FR] France ................ 79 04987

[51] Int. Cl.³ ................... F02K 9/12; F02K 9/82
[52] U.S. Cl. .................. 60/231; 239/127.3; 239/265.23; 251/368
[58] Field of Search .......... 60/231; 239/127.3, 265.17, 239/265.23; 251/326, 368, 340

[56] References Cited

U.S. PATENT DOCUMENTS

| 3,091,924 | 6/1963 | Wilder | 60/231 |
|---|---|---|---|
| 3,104,523 | 9/1963 | O'Donnell | 60/255 |
| 3,296,799 | 1/1967 | Fuentes | 60/231 |
| 3,583,672 | 6/1971 | Haller | 251/368 |
| 3,680,788 | 8/1972 | Cox | 60/231 |
| 3,923,285 | 12/1975 | Diehl et al. | 251/326 |
| 3,976,094 | 8/1976 | Jandrasi et al. | 251/326 |
| 4,042,207 | 8/1977 | Nehrlich | 251/326 |

FOREIGN PATENT DOCUMENTS 1522555 4/1968 France .
1434195 5/1976 United Kingdom ........... 239/265.23

OTHER PUBLICATIONS

Wescon Tech. Paper, No. 11, Aug. 22, 1967, (Westcon Periodicals, N. Hollywood, Calif.), pp. 12, 13, and FIG. 22.

Primary Examiner—Louis J. Casaregola

[57] ABSTRACT

This invention concerns the piloting of propulsion systems for solid rocket propellant missiles.

It consists of a piloting assembly in which the front section of a thrust nozzle integrated in the body of a propulsion system is pierced with at least three orifices which can be covered by means of valves and which are designed to provide direct injection into the thrust nozzle of hot gases from the powder block of the propulsion system to pilot the missile. An auxiliary block of "cold" powder is fitted around the nozzle on the input side of the orifices.

The application is for piloting of ballistic missiles.

12 Claims, 3 Drawing Figures

DEVICE FOR PILOTING THE PROPULSION SYSTEM OF A SOLID PROPELLANT ROCKET

BACKGROUND OF THE INVENTION

The invention relates to the piloting of propulsion systems for solid rocket propellant missiles.

Among the various systems used to pilot the propulsion system of a ballistic missile, mention must first be made of the system of piloting by the use of adjustable thrust nozzles. In this system, the reactor jet or propulsion system of the missile can be moved and controlled to pilot the missile. A system of this type is heavy and complicated to realize.

Another piloting system consists in placing aerodynamic rudder surfaces in the exhaust nozzle jet in order to exert strong lateral forces on the propulsion system. Generally speaking, this type of piloting produces a considerable air lag which tends to restrict the performance of the propulsion system.

Another known system of piloting consists in equipping the sides of a main propulsion system with a series of small auxiliary propulsion units which are completely independent of the main propulsion system. These auxiliary units require very careful construction and design since they affect considerably the safe operation of the complete propulsion unit and furthermore add considerably to the weight of the missile.

Finally, one of the latest known processes of missile piloting consists in injecting into the thrust nozzle at carefully selected points, hot gases from the propulsion system. Thus, in accordance with French Pat. No. 1.488.319, gases are extracted from the propulsion chamber and reinjected into the diffuser nozzle. A process of this kind and various methods of implementing it are also described in French Patent Application No. 69/09 927 and the U.S. Pat. Nos. 3,147,590 and 3,759,039. But, as indicated in these earlier documents, the extracted gases are made to circulate in a duct or chamber located outside the propulsion system. They therefore leave the propulsion system before being reinjected into the diffuser nozzle through a valve which is also located outside the system. In most of the solutions adopted it is necessary to pierce the structure of the reservoir in order to create a passage for the hot gas ducts. This is a complex and delicate operation and therefore lacking in reliability and further requires that the structure be reinforced which, added to the presence of the ducts, results in considerable additional weight.

SUMMARY OF THE INVENTION

The purpose of this invention is to remove the disadvantages of the various systems described above by creating a piloting system for a solid rocket propellant propulsion unit by injecting hot gases from the propulsion system into the thrust nozzle. The invention is characterized by the fact that the forepart of the nozzle integrated within the propulsion system body has, drilled or pierced in its wall, at least three direct injection ports to receive the hot gases from the propulsion system and each portion can be obturated as required by means of a valve. A piloting arrangement of this type has the advantage of being compact, light and reliable since it requires no drilling in the propulsion system structure and dispenses with all external ducts and chambers.

The ports mentioned and the obturating means of said valves are located within the body of the propulsion system and they can be protected from the action of heat and erosion (caused by gases from the propulsion system) by an auxiliary powder-block located in the vicinity and containing powder selected to emit gases which are much less hot and erosive than the combustion gases from the propulsion system. This auxiliary powder block can be conveniently molded in the form of a ring around that section of the nozzle which is integrated within the body of the propulsion system, and protected by interposition of a protective insulating sleeve and a layer of an inflammation inhibitor to protect the auxiliary powder block from the action of heat caused by the nozzle when at high temperature. Preferably, the powder contained in the auxiliary block should be of a type with a low aluminium content rate, which supplies reducing gases.

The obturating means of each of the said valves is advantageously a cover plate, preferably in carbon, which can be slid across the valve; each cover plate is connected to the rod of a control jack with interposition of an insulating means. The connection between jack rod and cover plate is preferably formed of a combination of adhesive bonding and dovetail joint secured by a lock pin.

This invention envisages the construction of the rod which activates the cover plate in a metal such as for example a refractory alloy, stainless steel or similar which is cooled by a fluid cooling system. The ideal method for cooling the cover plate control rod is by using the fluid which activates the jack and is contained in the chambers of the latter and/or an auxiliary chamber located on the inlet side of these chambers and surrounding the control rod. In this manner the rod can be cooled by forced circulation of the fluid from the auxiliary chamber, fed by fluid independent of the jack chambers.

The edges or ledges of the injection ports forming the seats of the cover plates may also be covered with a carbon-carbon material. The latter can differ from the carbon-carbon material of the nozzle; in this case the seat is a separate unit inserted into the monoblock jet stream unit.

The following description read in conjunction with the attached drawings clearly show how the invention can be used in practice.

DETAILED DESCRIPTION

Figure 1:
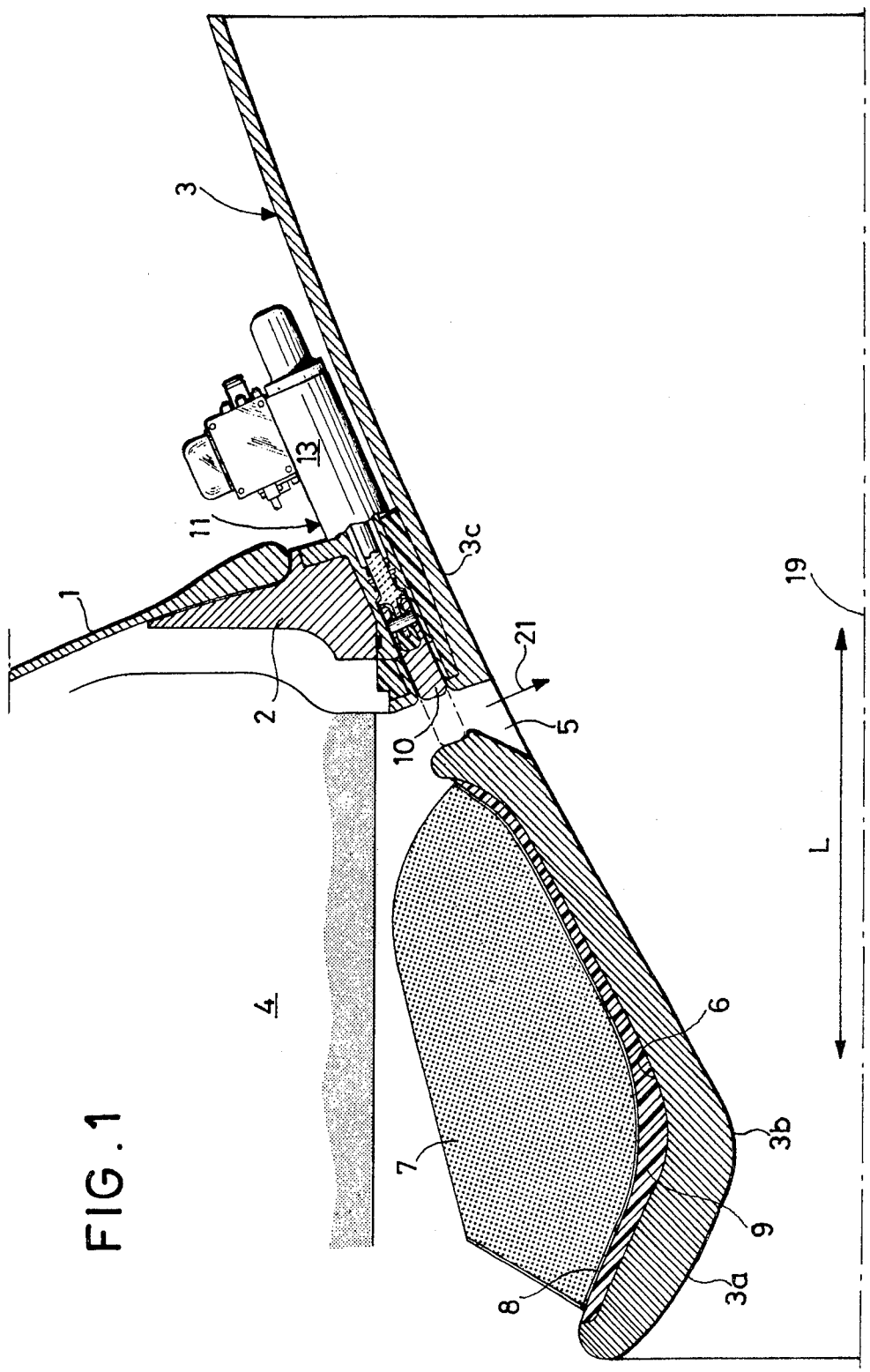
FIG. 1 is a longitudinal-section diagram of a thrust nozzle fitted with a piloting unit according to the invention, with only half of the nozzle being shown.
Figures 2, 3:
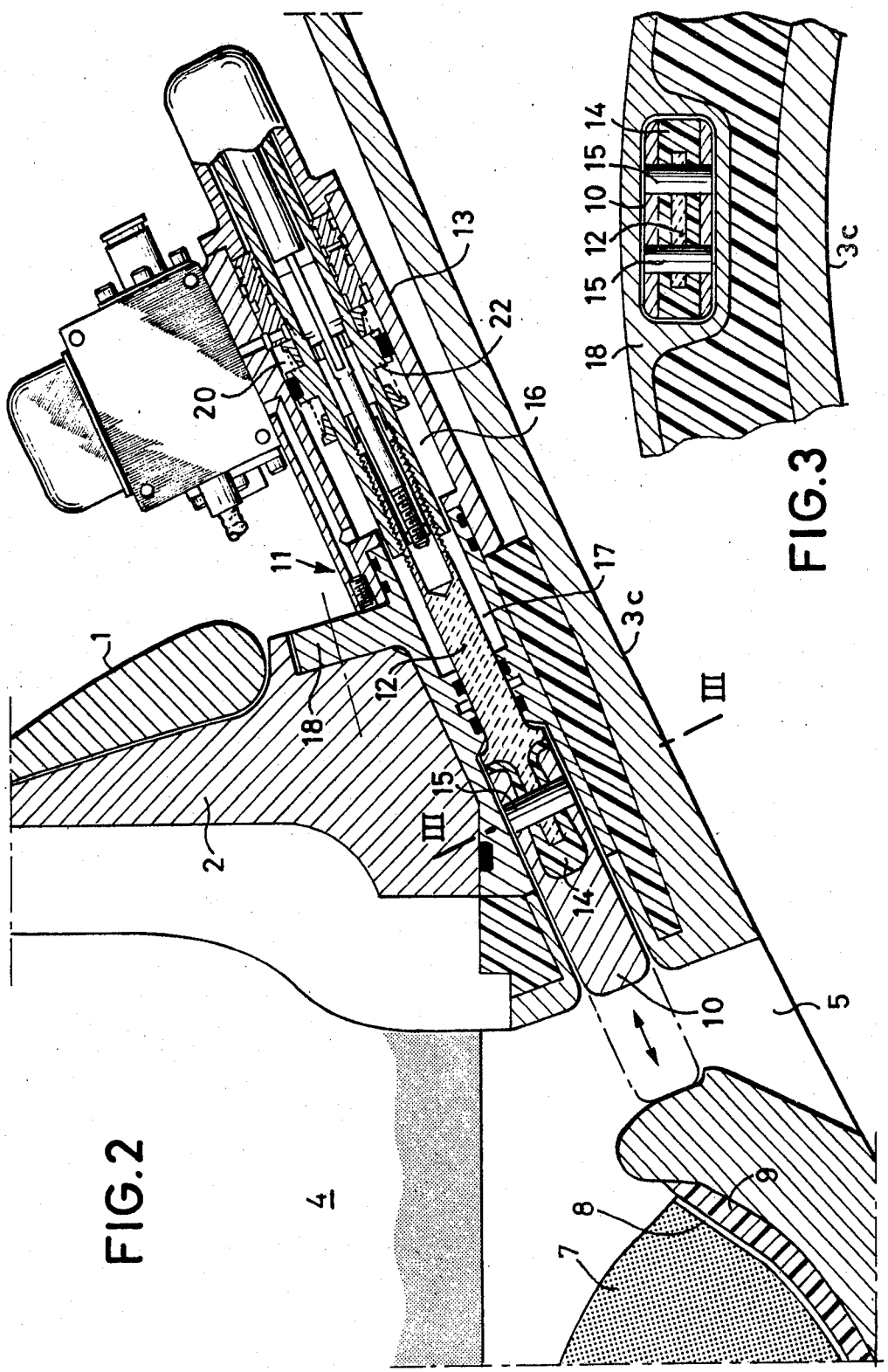
FIG. 2 shows the central part of FIG. 1 on a larger scale.
FIG. 3 is a section along the line III—III of FIG. 2.

FIG. 1 shows the rear section of a propulsion system of a rocket or ballistic missile. To the base of the cover of the propulsion system 1 has been fixed a metal annular collar 2 in which is fitted a fixed nozzle 3 on an annular frame 18. The nozzle of the type described in French Patent Application No. 77/33 442 in the name of the applicant, consists of a single monoblock part in carbon the shape of which reveals the various parts of the nozzle, i.e. the convergent part or concentrator 3a, the throat 3b and the diffuser 3c. A large section of the nozzle 3 comprising the concentrator, the throat and a length L of the diffuser is inserted within the body of the propulsion system 1 which includes a conventional charge consisting of a powder block 4 whose combustion produces very hot and generally highly erosive gases.

Substantially upstream of the area of penetration of the nozzle 3 within the body of the propulsion system 1, and therefore within the said body, the diffuser nozzle 3c is pierced or drilled with at least three ports such as 5 extended through the wall of the nozzle to the bore thereof and located in the same plane and perpendicular to the axis 19 of the propulsion system; these ports may be in the form of holes or slots for injection and their shape and number will be those best adapted to the mechanical design and performance of the nozzle and to achieve the most efficient piloting.

On the inlet side i.e. upstream of the orifices 5, on the external wall 6 of that section of the nozzle integrated within the body of the propulsion system 1, is an annular shaped powder block 7. This auxiliary powder block containing powder with a low aluminium content is burnt at a temperature substantially lower than the charge 4 of the propulsion system and produces reducing gases. In the example shown, this annular block 7 is molded directly onto the nozzle. It is insulated from the monoblock jet stream unit by an inhibiting ring 8 and a sleeve 9 constructed of an insulating material such as for example a refractory cement or a fibre-resin composite (graphite or phenolic carbon), to avoid excessively rapid combustion of the block 7 by inflammation of the inner face of the latter by the jet stream unit material. In fact, the latter when the propulsion system assembly is operating will be at a much higher temperature than the auto-inflammation temperature of the powder in the auxiliary block 7.

Each of the ports 5 enables hot gases to be injected directly from the propulsion system into the diffuser of nozzle 3c (in the direction of arrow 21); when the nozzle is operating normally, it is closed by the gate 10 of an injection valve 11. The gate 10 is in the form of a plate, constructed of a carbon-carbon material and fixed to the rod 12 of a hydraulic control jack 13 controlling the injection valve. This jack is located outside the propulsion system 1 and is mounted on the frame 18 of the nozzle, by means of a screwed flange not shown in the drawing.

The control rod 12 formed of a refractory alloy is bonded with adhesive to the plate 10 with interposition of an insulation 14, e.g. of phenolic carbon. The plate insulation connection, i.e. carbon-carbon/phenolic carbon, is dovetailed because when hot the adhesive bond between the two parts 10 and 14 is destroyed. Bonding with adhesive is also used for the connection between control rod 12 and insulation 14, i.e. refractory alloy-phenolic carbon. Furthermore, the three parts concerned (vane 10, insulation 14 and rod 12) are secured by two lockpins 15 in carbon-carbon as a safety measure to avoid any risk of relative lateral displacement of any part.

The control rod 12 of the cover plate 10 for an injection hole 5 is cooled by the hydraulic liquid activating jack 13, present in chamber 16 and 20 of said jack around its piston 22 and in an auxiliary chamber 17 located on the inlet side (i.e. upstream) of the upper chamber 16. The rod 12 can also be cooled if necessary by forced circulation of fluid in the auxiliary chamber 17. In this case the latter will be equipped with hydraulic fluid independant from that for the jack 13.

This cooling system and the fitting of the jack directly to the frame 18 of the nozzle will produce an effective seal at the valve plate 10 and its control rod 12 because of the external over-pressure due to the hydraulic liquid, with regard to the propulsion system, which will prevent leakage of combustion gas or seizing of the control rod after repeated expansion. Furthermore, the seal for the control rod is effected in a conventional manner using two O-ring seals with an intermediate drain.

To pilot the propulsion system of a ballistic missile efficiently, the piloting unit described in this invention includes at least three injection ports 5 located in the same plane and spaced equally at 120° around the nozzle and each fitted with a cover plate assembly. The nozzle could alternatively be fitted with four ports and cover plate assemblies spaced at 90° intervals.

In normal operation, each plate 10 will cover its corresponding injection port 5. The thermal environment in the area of the injection parts will be more favourable, due to the presence of the reducing gases from the auxiliary powder block 7 having a low combustion temperature and therefore being erosive than those produced by combustion of the propulsion system block 4.

In this less destructive environment, the plates 10 are protected from erosion both by the combustion of this block 7 of "cold" powder and because they are made of carbon-carbon material. Furthermore, the gases from auxiliary block 7 will also protect the nozzle from the aggressive atmosphere caused by gases from the main block 4. However, the use of an auxiliary block of this type will only be justified if the gases from the main block are likely to cause an atmosphere which may damage the component materials of the cover plates and/or nozzle.

When the missile is to be steered, activation of the jacks 13 will control the retraction of one or more of the plates 10 and very hot gases from the main powder block 4 will enter the corresponding ports 5 and be injected directly into the diffuser nozzle. Also in this case the flow from the auxiliary block will, by mixing with the flow from the main block, contribute to weaken the thermochemical attack on the inlet ports, the plates of the valves and their seats.

The device of the injection ports, of the auxiliary powder block and of the cover plate systems results in a compact light, reliable, integrated piloting system which can be separately controlled independently of the body of the propulsion system, the structure of which will not be affected by the presence of the piloting unit according to the invention.

I claim:

1. An improved propulsion system for a missile, the system being of the type having a solid propellant which produces hot and erosive propellant gases, and a nozzle for the piloting of the missile responsive to the passage of the propellant gases into the nozzle, the nozzle having a bore extended therethrough which includes a concentrator, a diffuser and a throat connected between the concentrator and the diffuser, the improvement wherein the nozzle comprises a forepart composed of the concentrator, the throat and a length of the diffuser integrated within the propulsion system with the solid propellant surrounded about a portion of the forepart; the forepart having a plurality of ports extended through the wall of the nozzle from the outer surface of the nozzle to the bore for the direct passage of the propellant gases from the solid propellant to the bore; means, mounted on the outer surface of the nozzle within the propulsion system, for obturating the ports; an auxiliary powder block combustible to emit gases which are cooler and less corrosive than the propellant gases, said auxiliary powder block having the shape of a ring and being integrally molded around a portion of the forepart proximate the ports and the obturating means; and further comprising an insulating sleeve and a layer of flame inhibitor interposed intermediate the auxiliary power block and the nozzle.

2. The improved propulsion system as set forth in claim 1 wherein the obturating means comprises cover plates slidably mounted, the plates being slidable transversely relative to the path of the propellant gases through the ports on the other surface of the nozzle; a control jack including a rod; means for connecting the rod to the cover plate; and an insulation member interposed between the connecting means and the rod.

3. The improved propulsion system as set forth in claim 2 wherein the cover plate comprises a carbon-carbon material.

4. The improved propulsion system as set forth in claim 2 wherein the connecting means comprises an adhesive adhering the rod to the cover plate, the rod being connected to the cover plate in a dove tail joint, and lock pins securely engaged to the rod and the cover plate.

5. The improved propulsion system as set forth in claim 2 or 3 or 4 wherein the cover plate comprises a refractory alloy; and further comprising means for fluidly cooling the rod.

6. The improved propulsion system as set forth in claim 5 further comprising jack means for activiating movement of the rod including the fluid for cooling the rod.

7. The improved propulsion system as set forth in claim 2 or 3 or 4 wherein the cover plate comprises a stainless steel; and further comprising means a fluid for cooling the rod.

8. The improved propulsion system as set forth in claim 7 further comprising jack means for activating movement of the rod including the fluid for cooling the fluid for cooling the rod.

9. The improved propulsion system as set forth in claim 6 wherein the jack means includes a piston cylinder, a piston movably mounted in the cylinder and dividing the cylinder into a first chamber and a second chamber; the piston being connected to the rod in the first chamber; and means for independently circulating the fluid through the first and second chambers.

10. The improved propulsion system as set forth in claim 8 wherein the jack means includes a piston cylinder, a piston movably mounted in the cylinder and dividing the cylinder into a first chamber and a second chamber; the piston being connected to the rod in the first chamber; and means for independently circulating the fluid through the first and second chambers.

11. The improved propulsion system as set forth in claim 1 further comprising a carbon-carbon material forming a seat about the edge of the ports for the obturating means.

12. The improved propulsion system as set forth in claim 1 wherein the ports are disposed about the diffuser at circumferentially spaced intervals in the same plane.

* * * * *